Aug. 10, 1948. E. A. CLARK 2,446,528
AIRCRAFT HAVING POWER-DRIVEN, ADJUSTABLE,
RETRACTABLE AND STEERABLE FRONT WHEELS
Filed Dec. 23, 1944 7 Sheets-Sheet 1
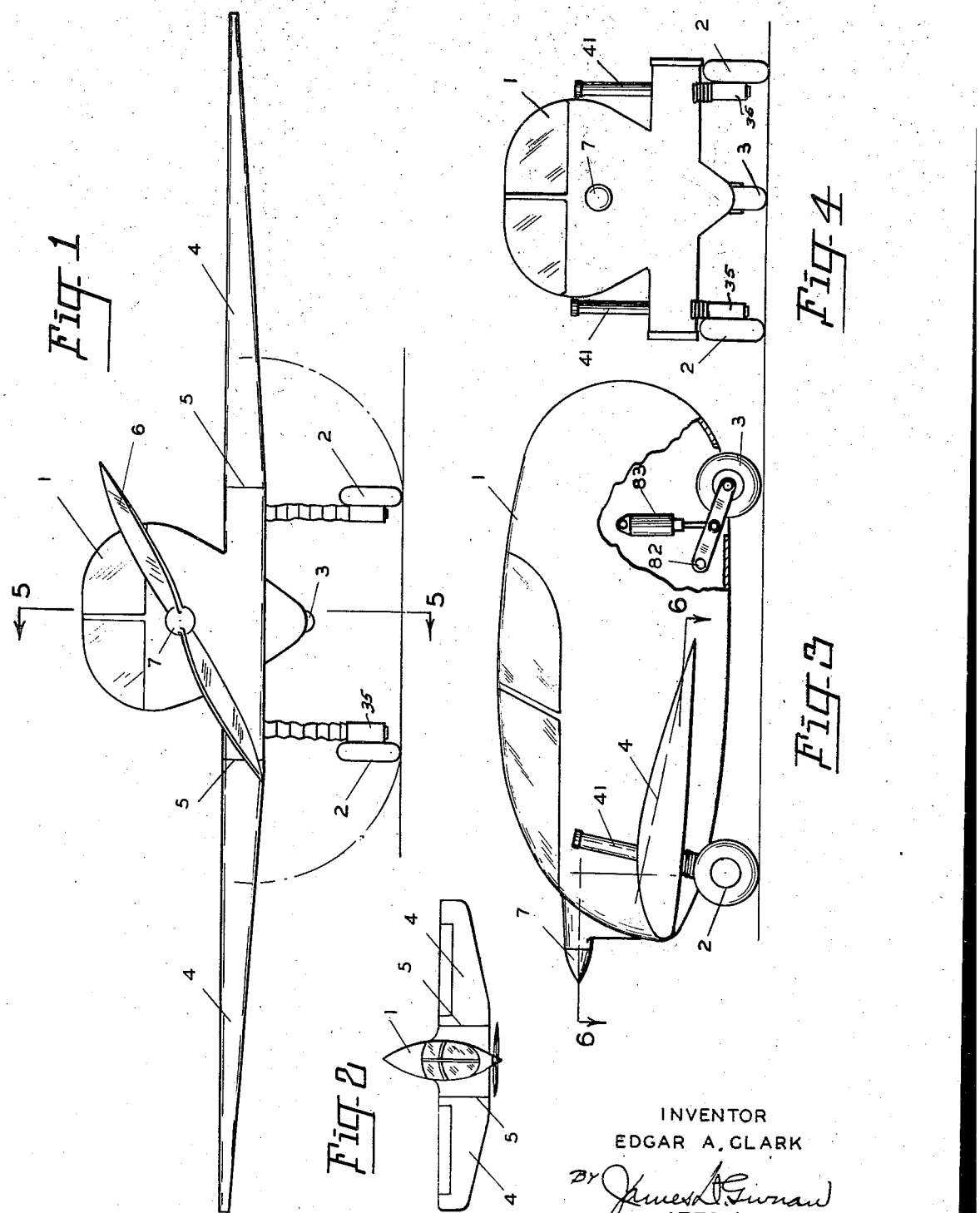
INVENTOR
EDGAR A. CLARK
ATTORNEY

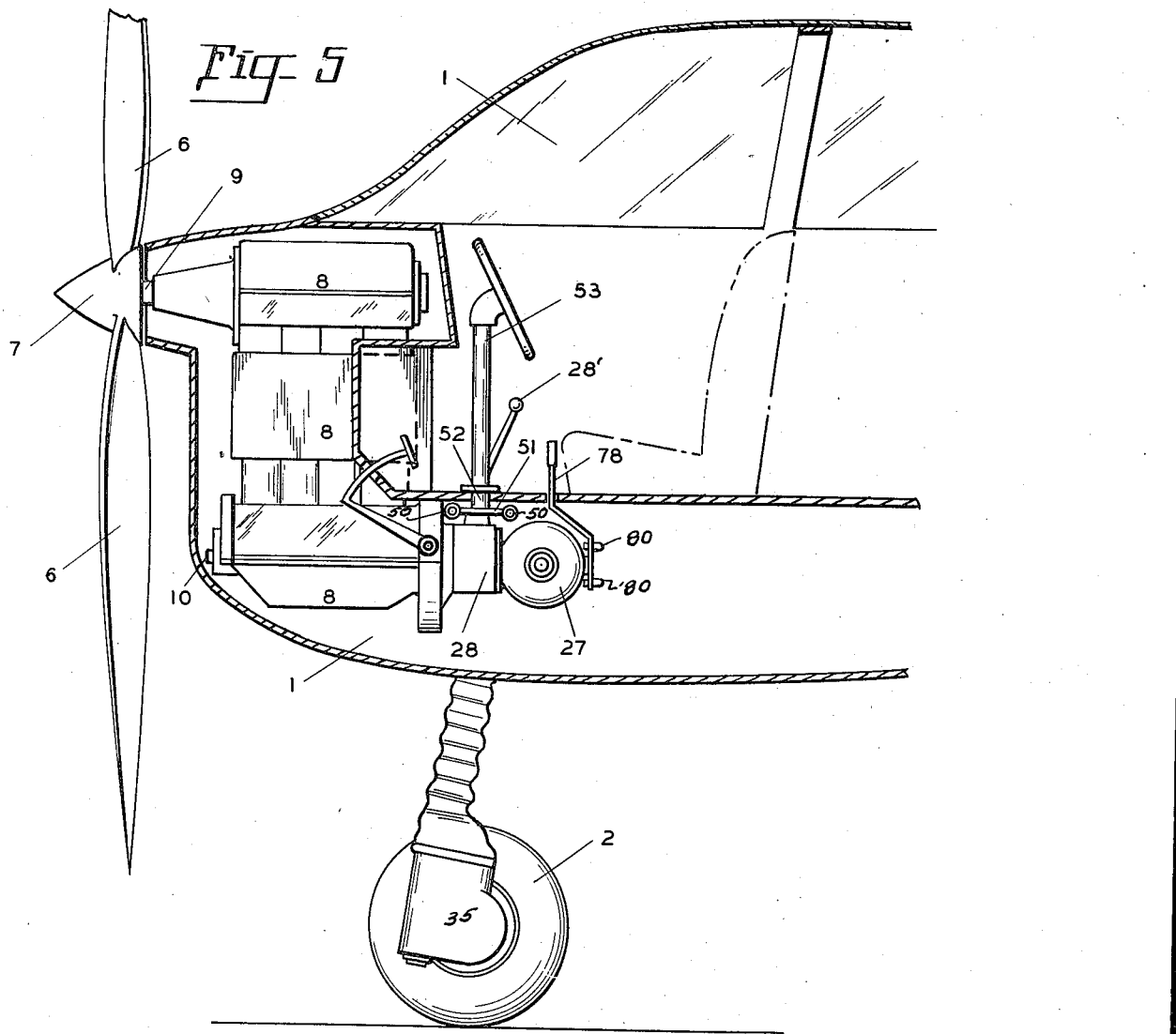

Aug. 10, 1948.　　　　　E. A. CLARK　　　　　2,446,528
AIRCRAFT HAVING POWER-DRIVEN, ADJUSTABLE,
RETRACTABLE AND STEERABLE FRONT WHEELS
Filed Dec. 23, 1944　　　　　　　　　　　　7 Sheets-Sheet 3

INVENTOR
EDGAR A. CLARK

ATTORNEY

Aug. 10, 1948.   E. A. CLARK   2,446,528
AIRCRAFT HAVING POWER-DRIVEN, ADJUSTABLE,
RETRACTABLE AND STEERABLE FRONT WHEELS
Filed Dec. 23, 1944   7 Sheets-Sheet 4
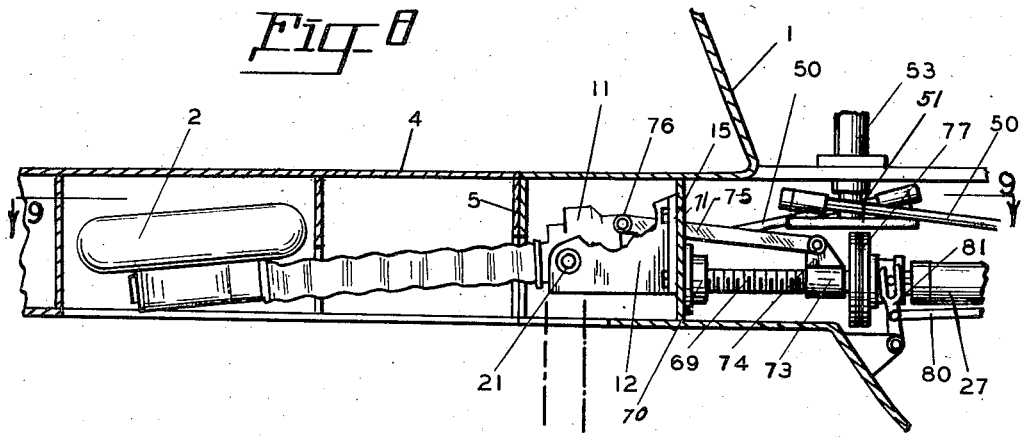
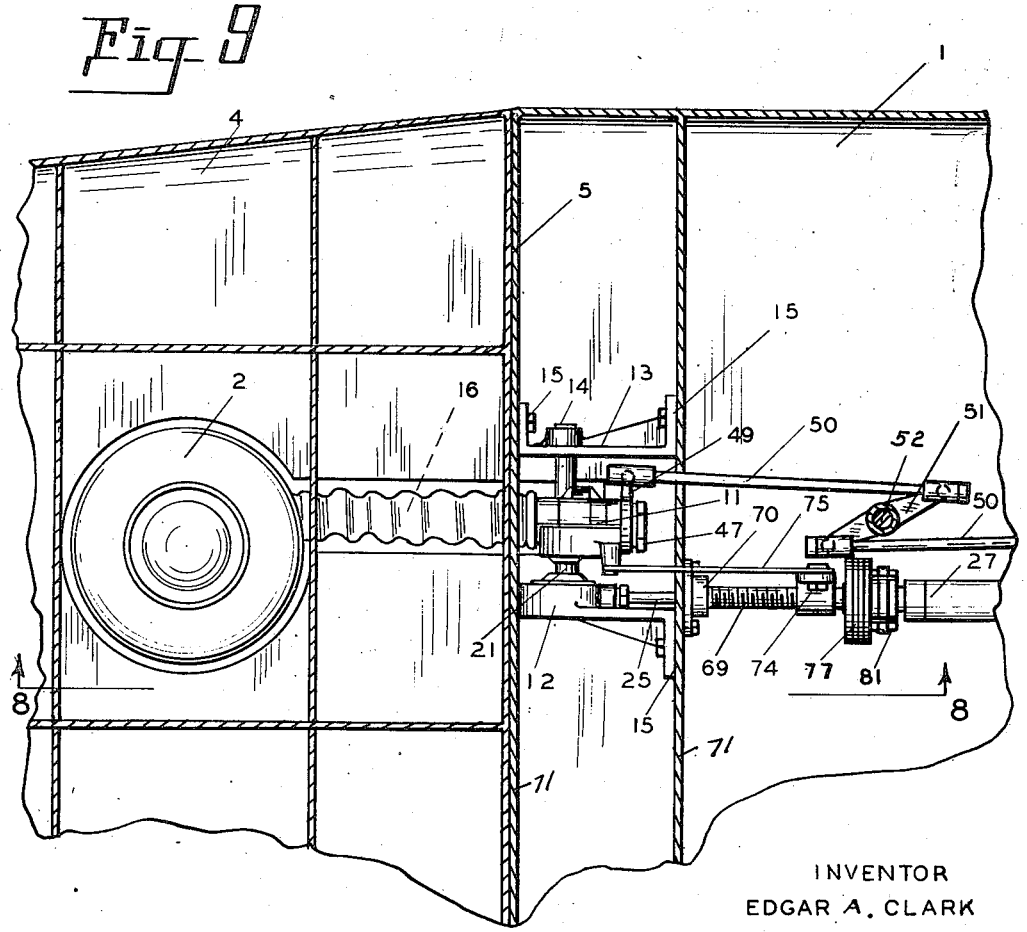
INVENTOR
EDGAR A. CLARK
By James D. Girman
ATTORNEY

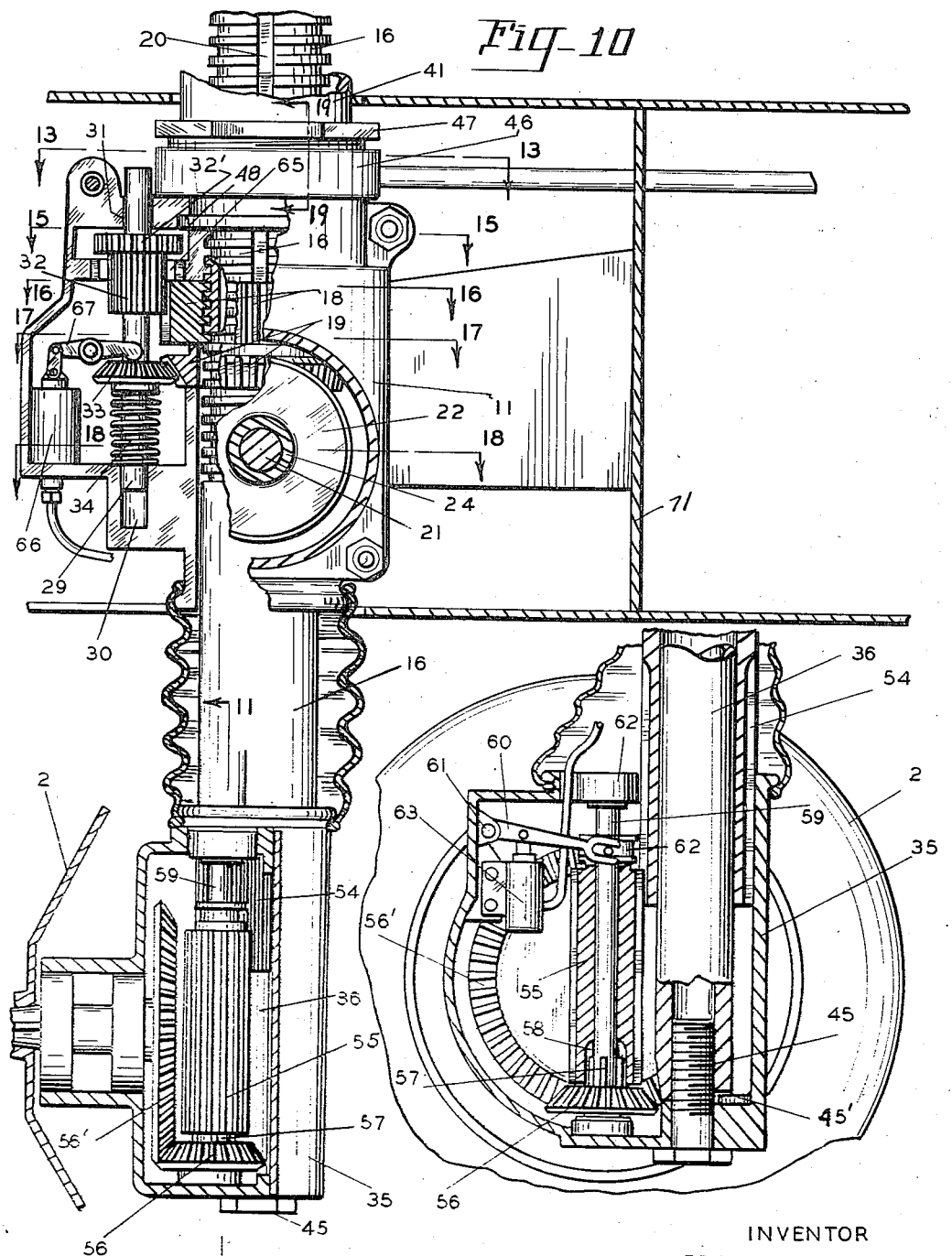

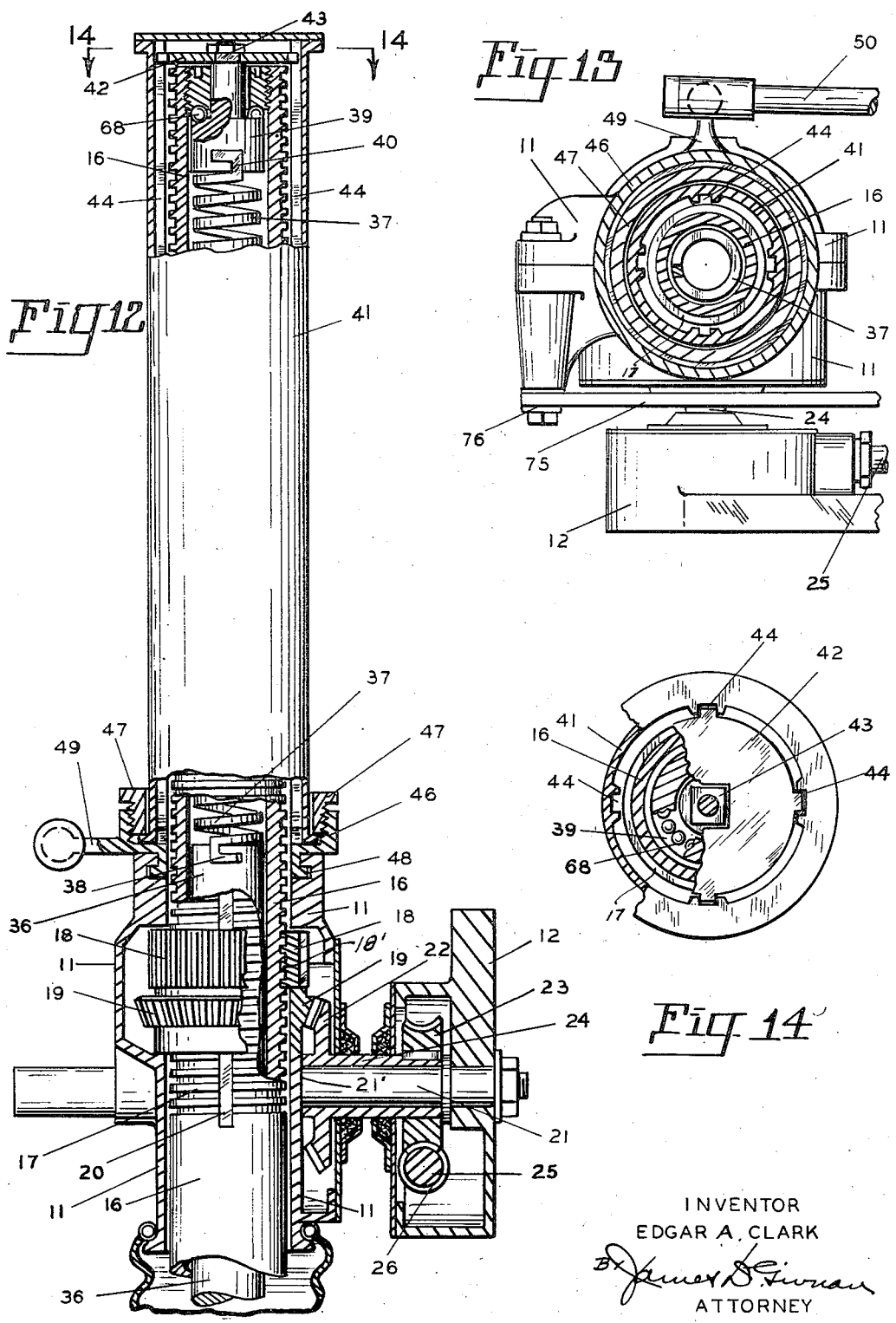

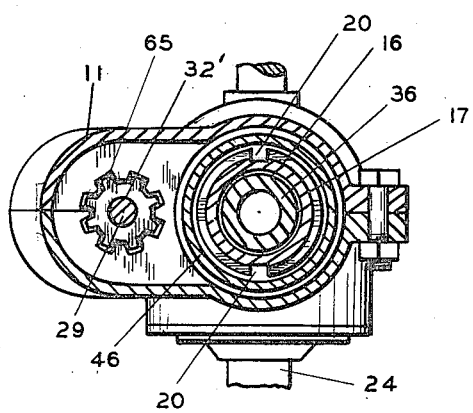
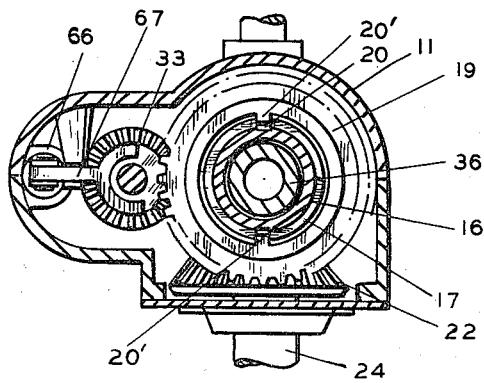
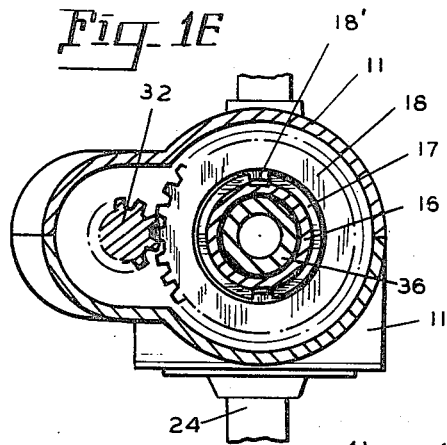
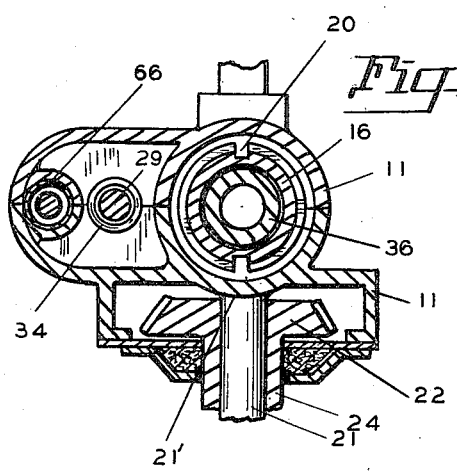
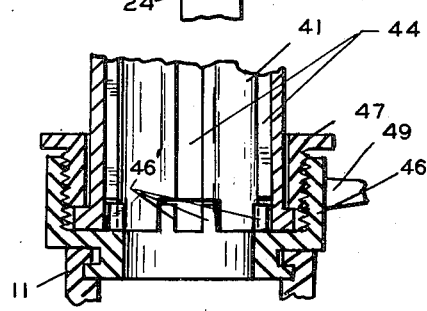

Patented Aug. 10, 1948

2,446,528

UNITED STATES PATENT OFFICE 2,446,528

AIRCRAFT HAVING POWER-DRIVEN, ADJUSTABLE, RETRACTABLE, AND STEERABLE FRONT WHEELS

Edgar A. Clark, Seaside, Oreg.

Application December 23, 1944, Serial No. 569,470

3 Claims. (Cl. 244—50)

This invention relates to improvements in aircraft and more particularly to a vehicle which may be converted from an automobile into an airplane by merely attaching wings and a propeller to the vehicle.

A further object is the provision of means for elevating the forward end of the vehicle with respect to the landing wheels to provide propeller clearance for the take-off.

A further object is the provision of novel power transmission means for operating the landing wheels of the craft when it is used as an automobile.

These and other objects will appear as my invention is more fully hereinafter described in the following specification illustrated in the accompanying drawings, and finally pointed out in the appended claims.

In the drawings:

Figure 1 is a front elevation of my new and improved combination airplane and automobile, illustrating the same assembled to fly.

Figure 2 is a reduced plan view of Figure 1, illustrating the flying assembly.

Figure 3 is a side view of Figure 1 shown with wings and propeller removed for road work, and with a fragment of the fuselage broken away to illustrate the tail-wheel.

Figure 4 is a front elevation of Figure 3.

Figure 5 is an enlarged fragmentary sectional side elevation of the invention, taken on the line 5—5 of Figure 1, illustrating the power plant, transmission assembly, propeller mounting and landing gear which in this view is extended to a take-off or landing position.

Figure 8 is a fragmentary sectional view of the landing gear in a retracted or flying position, taken on line 8—8 of Figure 9.

Figure 9 is a fragmentary sectional plan view of Figure 8, taken on line 9—9 therein.

Figure 10 is a fragmentary sectional view of the landing gear assembly, taken on line 10—10 of Figure 6 with parts broken away for convenience of illustration, and illustrating the same position for operating as a road vehicle.

Figure 11 is a fragmentary sectional view, taken on line 11—11 of Figure 10 of the lower part of the landing gear.

Figure 12 is a fragmentary sectional view of the landing gear, taken on line 12—12 of Figure 6, and showing the landing gear in position for operating as a road vehicle.

Figure 13 is a fragmentary sectional plan view, taken on line 13—13 of Figure 10.

Figure 14 is a sectional plan view, taken on line 14—14 of Figure 12.

Figure 15 is a fragmentary sectional plan view, taken on line 15—15 of Figure 10.

Figure 16 is a fragmentary sectional plan view, taken on line 16—16 of Figure 10.

Figure 17 is a fragmentary sectional plan view, taken on line 17—17 of Figure 10.

Figure 18 is a fragmentary sectional plan view, taken on line 18—18 of Figure 10.

Figure 19 is a fragmentary sectional detail view taken along the line 19—19 of Figure 10, with certain parts omitted.

Figure 6:
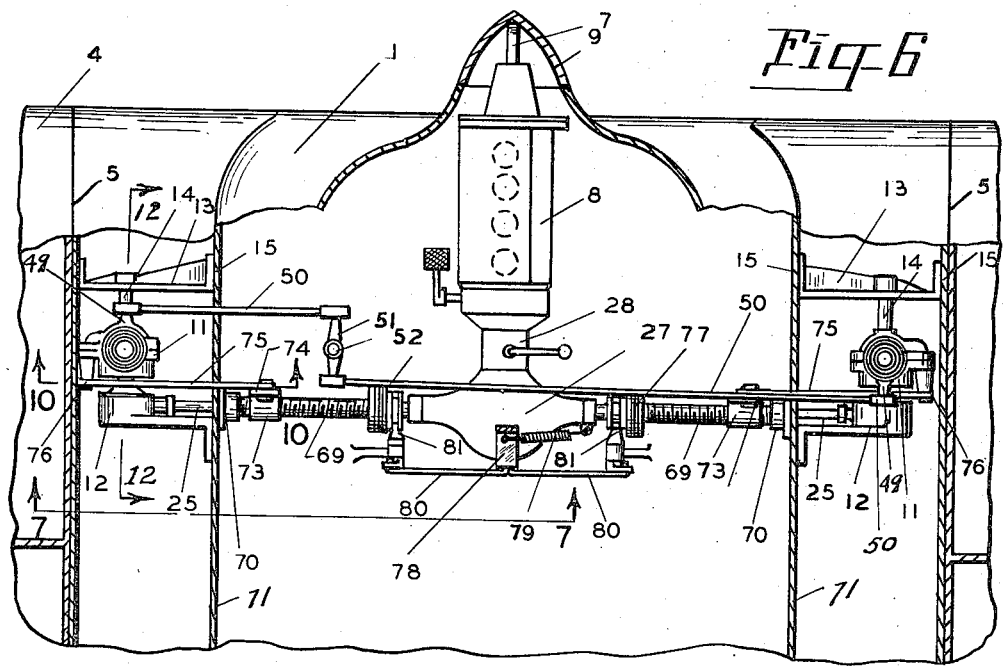
Figure 6 is a fragmentary plan view, taken on line 6—6 of Figure 3, illustrating the power plant, transmission means and landing gear mechanism.

Referring now more particularly to the drawings:

The invention consists of a fuselage or body 1, of any suitable design and passenger seating arrangement, supported on the forward end by wheels 2 and on its trailing end by a tail-wheel 3. Removable wings 4 are mounted to the body 1 at 5, by any approved conventional means, when the vehicle is being used as an airplane. When used as an automobile the wings are removed at this point and the vehicle appears as in Figures 3 and 4.

I have provided means (to be more fully hereinafter described) for lowering the wheels 2, as illustrated in Figure 1, to the extreme position for landing and taking-off when the vehicle is being used as an airplane. This same means serves to bring the wheels and body closer together for road work, and means for raising the wheels, as illustrated in Figures 3 and 4. I also provide means for retracting the wheels up into the wings 4 when in flight, as indicated by the broken line in Figure 1. When the vehicle is being used as an airplane the propeller 6 is mounted to the engine shaft through its hub 7 and removed when the vehicle is being used as an automobile.

When the vehicle is being used on the ground or road it is desirable to keep the body 1 as low to the ground or road as possible, and when used for flying purposes the forward end of the fuselage should be elevated from the runway surface so that the propeller 6 may have suitable clearance.

Referring to Figures 5 and 6, a power plant 8 is mounted in the forward end of the body 1, and is of the opposed piston type having two crank shafts 9 and 10. The crank shaft 9 drives the propeller 6, and the crank shaft 10 drives the wheels 2 for road work. I do not wish to be limited to the type of power plant as illustrated, since other types with a single crank shaft may be used and operatively connected by suitable transmissions, such as belts, gears, shafts, and the like.

I will now describe the mounting and operation of the landing gear, which forms an important part of my invention. The landing gear consists of a housing 11, pivotally mounted to brackets 12 and 13 at 14. These brackets form part of the body structure being secured thereto by any suitable fastening means 15. Working through the housing 11 is a tube or hollow shaft 16, having a thread 17 cut therearound throughout the greater portion of its length. A gear 18 having internally cut threads 18' is threadably mounted thereon and is held in a fixed longitudinal position within the housing 11. A bevel gear 19 surrounds the tube 16, and is splined thereto by the spline 20 coacting with the key 20'. The stub shaft 21 is fixedly secured to the housing 11 at 21' and has a bevel gear 22 rotatably mounted thereon. A worm gear 23 is keyed to the hub 24 of the bevel gear 22 and is driven by the worm 25. The worm 25 is fixedly mounted to the shaft 26 which extends into the differential assembly. (See Figures 6 and 7.) The differential assembly is mounted to a transmission 28, which is driven by the motor 8, whose operation will be hereinafter more fully described. A slidable stub shaft 29 is mounted within the housing 11 at 30 and 31. Upon this shaft is fixedly mounted a double spur gear 32 and 32' and a bevelled gear 33, is also fixedly mounted to the shaft 29. A spring 34 maintains the gear 33 in engagement with the bevelled gear 19. This makes a direct connection between the gear 19 and the spur gear 18, and as the gear 19 is revolved it will turn the shaft 16 through the spline 20 of the shaft 16 coacting with the key 20' within the gear 19, locking the gear 18 with the spur gear 19 by the gears 32 and 33. The shaft 16 will remain in a fixed longitudinal position while rotating, due to the fact that the threaded gear 18 will rotate therewith, therefore the threads 17 will remain stationary relative to the threads within the gear 18.

The lower end of the shaft 16 terminates in the wheel housing assembly 35, which is mounted to the wheel 2 in the following manner: A vertical shaft 36 is slidably mounted within the hollow shaft 16, having its upper end secured to the spring 37 and 38, and its lower end fixedly mounted to the wheel housing 35 by the locking bolt 45. The shaft 36 is held by the stop 45' from rotating within the housing 35. The upper end of the spring 37 is secured to the stub shaft 39 at 40.

The lower end of the housing 41 is fixedly mounted within the collar 46 by the lock nut 47 and a suitable keyed connection between the collar 46 and the tube 41. This keyed connection is illustrated in the fragmentary view in Figure 19, where the guides 46' forming part of the collar 46 coacts with the keyways 44 of the tube 41, prevent relative rotation between the tube 41 and the collar 46. The collar 46 is rotatably mounted with in the housing 11 at 48 and is revolved by the arm 49. The arm 49 has a ball and socket connection (see Figure 13) and a link 50 (see Figure 6) mounted thereon. The connecting link 50 is secured to a steering arm 51 which is mounted to the shaft 52, within the steering column 53 in any suitable manner. By rotating the housing 41 through the collar 46 and the steering mechanism just described, the stub shaft 39 is rotated at the same time revolving the spring 37 and the shaft 36. This in turn revolves the wheel housing 35 and the wheels 2 providing means for steering the vehicle. Splines or teeth 54 are formed on the lower end of the tube 16 and drive the spur gear 55 when the tube 16 is revolved. When the spur gear 55 is in the position illustrated in Figure 11 it drives the bevelled gear 56 by the stub spline shaft 57 working within the spline 58 of the gear 55. The bevel gear 56 drives the ring gear 56' which forms part of the wheels 2.

When it is desired to disconnect the driving tube 16 from the wheels 2, the gear 55 is raised or disconnected from the spline 57. The spline 57 forms part of the shaft 59 and as the gear 55 is raised on the shaft 59 it will no longer drive the bevelled gear 56 due to disconnecting the spline 57 from the splines 58. The gear 55 is raised by the lever 60, which is pivotally mounted at 61 within the housing, having its opposite end bifurated and engaging the usual yoke and collar 62. The lever 60 is operated by the hydraulic cylinder 63.

When the invention is being used as an automobile vehicle the landing gear is in the position shown in Figures 3, 4, 10, 11 and 12. When it is desired to raise the body of the vehicle, as illustrated in Figures 1 and 5, the following operation takes place:

Referring to Figure 10, the shaft 29 is lowered so that the gear 32' which forms part of the gear 32, will mesh with in the teeth 65 cut within the housing 11. The spur gear 33 will have been disengaged from the spur gear 19 slightly in advance, this operation is caused by the hydraulic cylinder 66 operating the lever arm 67, which forces the shaft 29 downward against the spring 34. When this takes place the gear 32 will hold the spur gear 18 in a fixed position preventing it from rotating, but as the driving shaft 26 drives the spur gear 22, as heretofore described, it will rotate the spur gear 19. This gear will revolve the tube 16 through the action of the splines 20 and keys 20; and as the spur gear 18 is being held from turning, the threads 17 contacting with the threads 18' will lower the tube 16, thus carrying the wheel assembly downward. The disc 42 will travel downward within the housing 41 and will be prevented from rotating by the spline 44. A bearing connection is provided between the stationary stub shaft 39 and the revolving sleeve 16 at 68, thereby permitting free rotation to the driving tube 16. This bearing also carries the load delivered from the wheel housing assembly through the shaft 36 and the spring 37 to the stub shaft 39 through the lower end of the spring at 40. The spring 37 not only prevents rotation between these assembled parts, but it provides the spring suspension for the vehicle upon its wheels 2.

I will now describe the mechanism provided for retracting the landing gear and nesting it under the wings. The housing 11, being pivotally mounted at 14, Fig. 9, to the brackets 12 and 13, may be revolved about its pivot point 14. The running positions are indicated in Figures 6, 7, 10, 11 and 12, while in Figures 8 and 9 the landing gear is shown in a retracted position for flight. A hollow sleeve 69 is mounted upon the driving shaft 26 and is held from end movement by the retaining collar 70, which is fixedly mounted to the frame 71. A threaded nut 73 is threaded to the sleeve 69 and has an arm 74 extending therefrom. A link 75 is pivotally mounted to the arm 74 at its one end and to the housing 11 at 76 at its opposite end. This link holds the housing 11 in a fixed position either vertically or horizontally. When it is desired to operate the sleeve 69 the clutches 77 are engaged by forcing the lever 78 against th spring 79 causing the link connections 80 to operate the yokes 81, engaging the clutches 77, rotating the sleeves 69, causing movement of the nut 73 along the sleeve 69 raising or lowering the landing gear.

Figure 7:
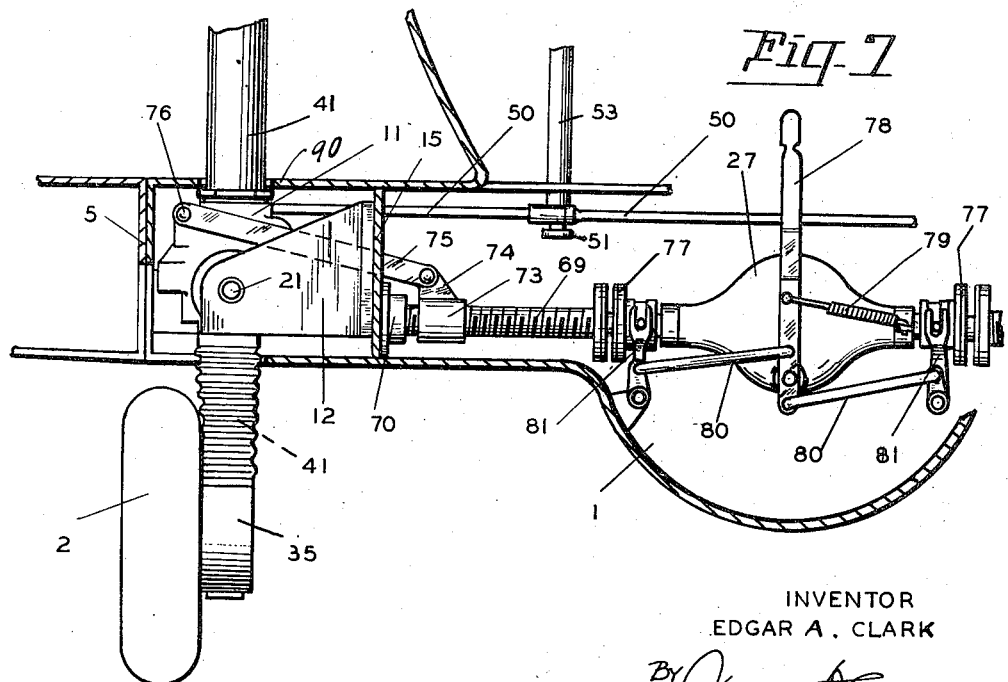
Figure 7 is a fragmentary sectional view, taken on line 7—7 of Figure 6, showing the landing gear in position for road work.

In order to raise the landing gear to folded position within the wings, the driving tube 16 and its associated assembly should be lowered to the position illustrated in Figure 5, at which time the housing 41 is removed by releasing the locking nut 47. This will permit the housing 11 to be rotated clearing the wing, as best illustrated in Figure 7, at 90. When the housing 41 is removed the disk 42 nests within the guides 46' of the steering collar 46, thereby providing means for continuing the steering of the vehicle while taking off and landing.

When the landing gear is in a retracted position and the engine 8 is running, the transmission 28 is operated so that the drive shaft 26 will be revolving in the proper direction, the lever 78 will then be operated to engage the clutches 77, rotating the sleeves 69, forcing the nuts 73 outwardly and revolving the housing 11 about its pivotal mounting 14. When the nut 73 comes to the end of its travel the clutches will automatically slip until released by the operator, allowing the spring 79 to release the clutches.

The wheels 2 are driven in the following manner: The transmission selects the proper direction of rotation and speed of the shaft 26. The shaft 26 will drive the worm gear 25 and the bevel gear 22, revolving the spur gear 19, which will drive the wheels 2 through the shaft 16, bevel gears 56 and ring gear 56'. The ring gear 56' is fixedly mounted to the wheel 2.

The wheels 2 are raised and lowered vertically in the following manner: The hydraulic cylinder 66 is caused to operate the lever 67 forcing the shaft 29 downwardly, engaging the spur gear 32' with the teeth 65 and disengaging the bevel gear 33 from the gear 19. This operation holds the spur gear 18 from rotating, and as the gear 19 revolves it rotates the hollow shaft 16 whose threads 17 engage the threads within the spur gear 18, raising or lowering the shaft 16. The raising and lowering is selected by the transmission 28 which controls the direction of rotation of the drive shaft 26. When the vehicle is being used as an automobile the rear of the vehicle is supported upon the tail-wheel 3, which is pivotally mounted to the body at 82 and raised and lowered by any suitable means, as the hydraulic assembly 83.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

1. A combination road vehicle and aircraft consisting of a body supported upon power-driven adjustable, retractible and steerable front wheels and an idling rear wheel, an engine disposed within the body and operatively connected with a propeller at the forward end of the body, means operated by said engine for extending or retracting said front wheels in a vertical plane parallel to the longitudinal axis to the aircraft and for driving said wheels while extended or retracted, further means operated by the engine for swinging the front wheels laterally into cavities formed in wings removably secured to the body, flight controls and controls for steering said front wheels being disposed within the body, whereby removal of the wings and the propeller render the vehicle capable for use as an automobile.

2. A combination road vehicle and aircraft consisting of a body supported upon front and rear wheels, a propeller removably secured to the forward end of the body and operatively connected with an engine disposed within the body, said engine having two crank shafts, one being operatively connected with said propeller, and the other being operatively connected with power transmission means for selectively extending or retracting said front wheels in a vertical plane parallel to the longitudinal axis of the aircraft and for driving said wheels when in an extended or retracted position, further means connecting with the power transmission means for swinging said front wheels laterally into cavities formed in wings removably secured to the body of the aircraft, and further means for control from the interior of the aircraft for steering said front wheels.

3. In an aircraft having a fuselage, wings, flight control surfaces, front wheels and an idling tail wheel, the combination of an engine carried by the fuselage and having two crank shafts, one of said shafts being connected with a propeller for actuating the same, the other of said shafts being operatively connected through power transmission means with means for extending or retracting said front wheels in a vertical plane parallel to the longitudinal axis of the aircraft and for driving the same when in an extended or retracted position, and further means operated by said power transmission means for swinging the front wheels laterally into cavities formed in the wings.

EDGAR A. CLARK.

REFERENCES CITED

The following references are of record in the file of this patent:

UNITED STATES PATENTS

| Number | Name | Date |
|---|---|---|
| 2,106,289 | Wallace | Jan. 25, 1938 |
| 2,181,574 | Burnelli | Nov. 28, 1939 |
| 2,199,966 | Timm | May 7, 1940 |
| 2,215,003 | Johnson | Sept. 17, 1940 |
| 2,360,988 | Thomas | Oct. 24, 1944 |

FOREIGN PATENTS

| Number | Country | Date |
|---|---|---|
| 40,821 | Austria | Feb. 10, 1910 |
| 370,788 | Great Britain | Apr. 14, 1932 |
| 539,405 | Great Britain | Sept. 9, 1941 |